United States Patent [19]

Goto et al.

[11] Patent Number: 5,200,940

[45] Date of Patent: Apr. 6, 1993

[54] OPTICAL UNIT ACTUATOR FOR INFORMATION RECORDING/REPRODUCING APPARATUS

[75] Inventors: Shoji Goto; Ichiro Kawamura; Hiroshi Yamamoto, all of Osaka, Japan

[73] Assignee: Matsushita Electric Industrial Co., Ltd., Osaka, Japan

[21] Appl. No.: 654,461

[22] Filed: Feb. 13, 1991

[30] Foreign Application Priority Data

Feb. 13, 1990 [JP] Japan .................. 2-32048

[51] Int. Cl.$^5$ .............................................. G11B 7/12
[52] U.S. Cl. ..................................................... 369/44.15
[58] Field of Search ............... 369/44.15, 44.16, 44.22, 369/112; 359/813, 823, 824

[56] References Cited

U.S. PATENT DOCUMENTS

| | | | |
|---|---|---|---|
| 4,367,543 | 1/1983 | Araki et al. | 369/44.15 |
| 4,613,202 | 9/1986 | Kuriyama | 369/44.15 |
| 4,960,321 | 10/1990 | Takahashi | 369/44.15 |
| 5,046,821 | 9/1991 | Seino | 359/823 |
| 5,070,489 | 12/1991 | Perry et al. | 369/44.15 |

FOREIGN PATENT DOCUMENTS

| | | | |
|---|---|---|---|
| 0178719 | 4/1986 | European Pat. Off. | |
| 59-124043 | 7/1984 | Japan | 369/44.16 |

OTHER PUBLICATIONS

Patent Abstracts of Japan, unexamined applications, P field, vol. 8, No. 31, Feb. 9, 1984 "The Patent Office Japanese Government" p. 97 P 253.

*Primary Examiner*—Donald McElheny, Jr.
*Attorney, Agent, or Firm*—Lowe, Price, LeBlanc & Becker

[57] ABSTRACT

An optical unit actuator for an optical information recording/reproducing apparatus includes an electromagnetic drive mechanism composed of a coil and a magnet cooperative to drive an objective lens mounted on an optical unit. One of the coil and the magnet is secured to the optical unit. The other of the coil and the magnet is held on a fixed unit with an elastic support member disposed therebetween, the fixed unit being immovable as against the movable optical unit. The elastic support member substantially dampens or takes up vibration caused by a reaction force creased as a result of acceleration of the objective lens when the objective lens is driven to follow a dynamic radial runout and an axial deflection of an optical disk. With the elastic support member thus provided, an optical component, a photo-electric transducer or the optical disk which is disposed on the side of the fixed unit is isolated from vibration. The control characteristics of a system including an optical head, the optical disk and a control circuit for the optical head can, therefore, be improved.

6 Claims, 4 Drawing Sheets

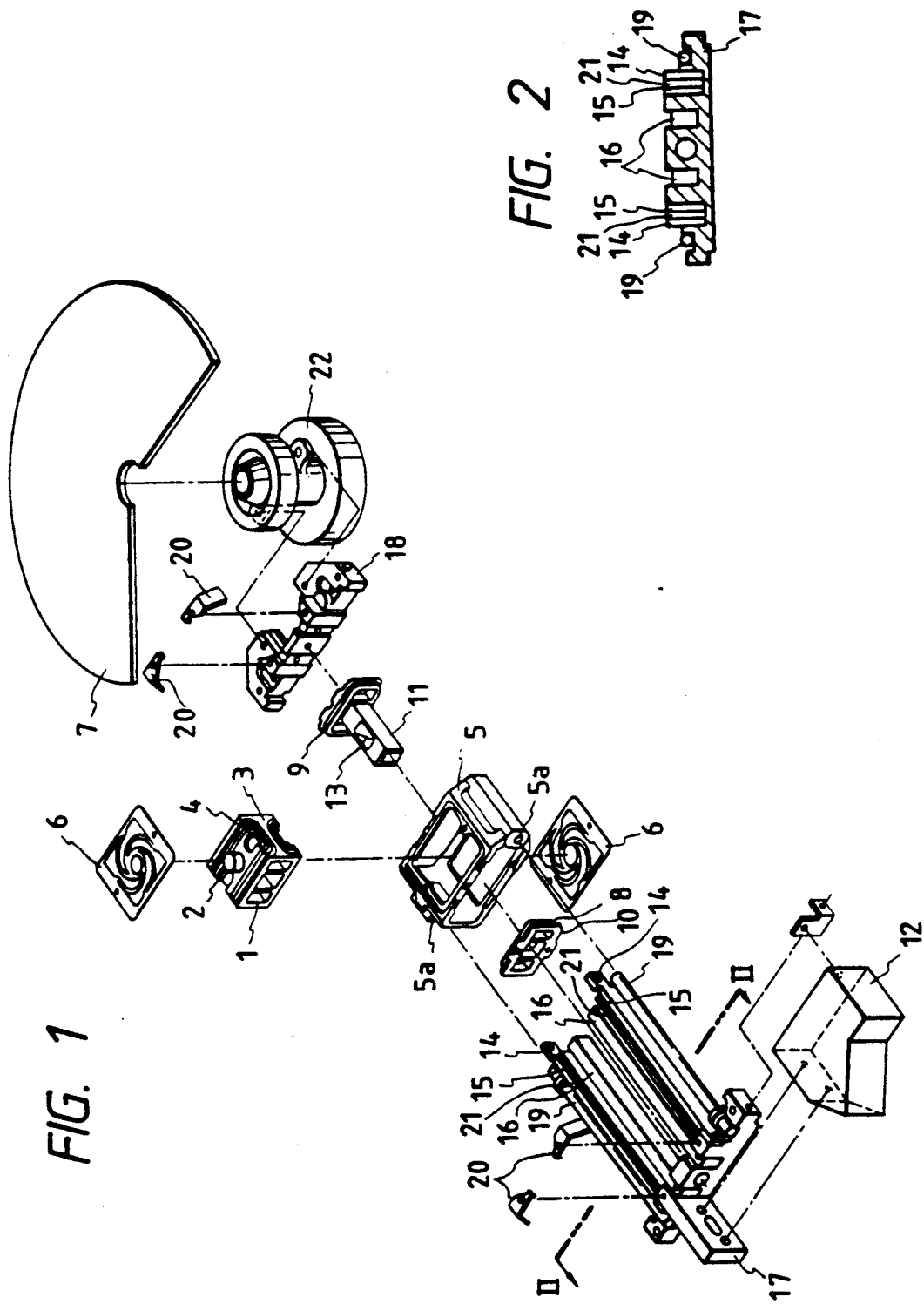

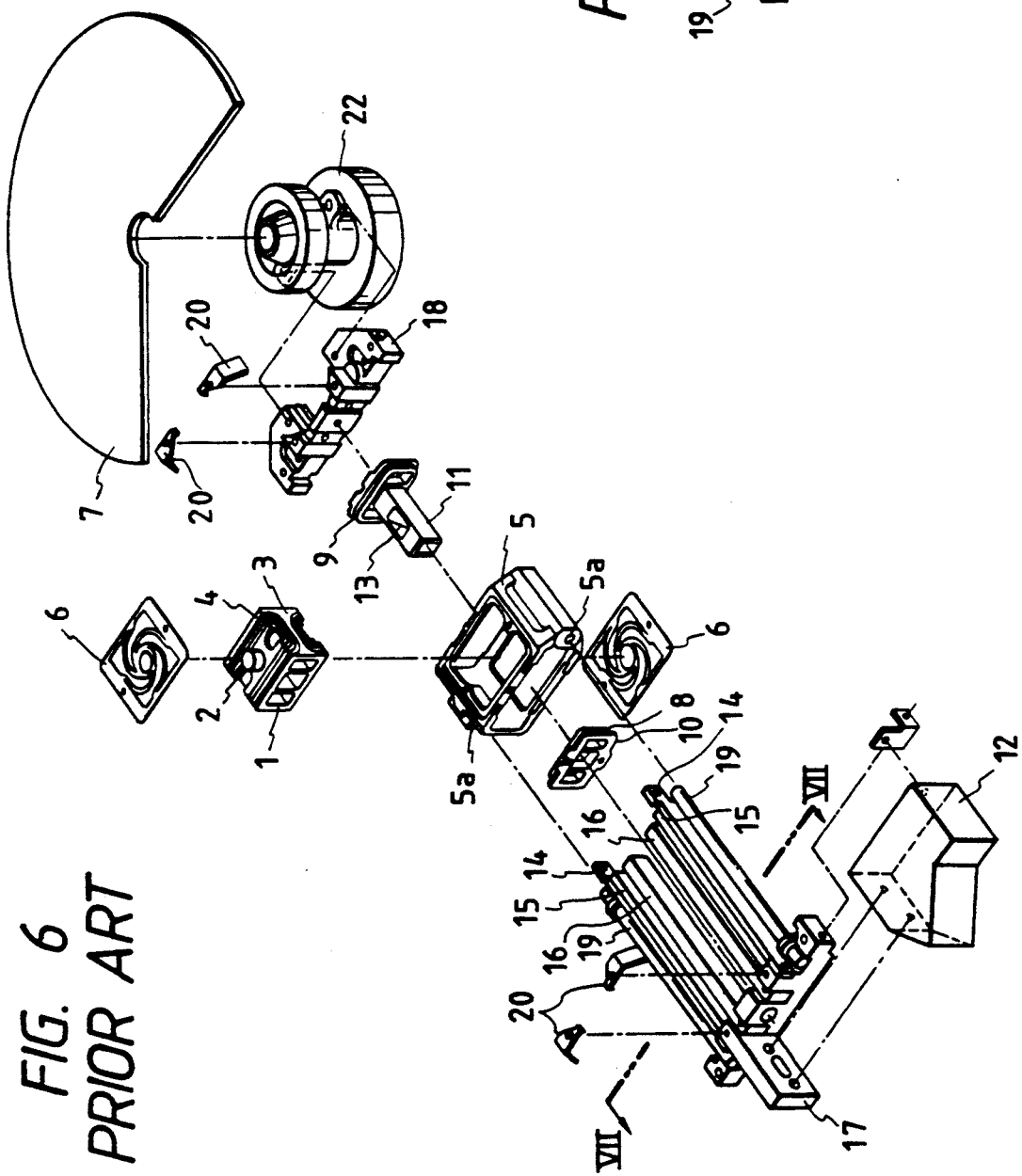

OPTICAL UNIT ACTUATOR FOR INFORMATION RECORDING/REPRODUCING APPARATUS

BACKGROUND OF THE INVENTION

1. Field of the Invention

The present invention relates generally to optical unit actuators for information recording/reproducing apparatus, and more particularly to an actuator for driving an optical unit including an objective lens for recording and reproducing information on an optical recording medium such as an optical disk.

2. Description of the Prior Art

With the spread use of optical disk drive units as an external storage for computers, the demand for a compact and high-speed unit has increased.

More specifically, there have been a demand for high speed rotation of an optical disk for the purpose of realizing a high data transfer rate, and a demand for a compact and flat structure resulting from the tendency toward an optical disk of a smaller diameter.

The speeding-up and compacting of the optical disk unit involves several problems to be solved. A main problem is the maintenance of control characteristics of an optical disk, an optical head and a control circuit for the optical head.

An optical unit actuator of a conventional information recording/reproducing apparatus will be described below with reference to FIGS. 6 and 7 of the accompanying drawings, in which FIG. 6 is an exploded perspective view of a main portion of the optical unit actuator, and FIG. 7 is a cross-sectional view taken along line VII—VII of FIG. 6.

As shown in FIG. 6, the actuator includes an objective lens holder 1 to which an objective lens 2, two opposed tracking coils 3 and a focusing coil 4 are secured by bonding. The objective lens holder 1 has a pair of aligned central cylindrical projections (not designated) which are fitted in the central holes of two opposed plate springs 6 and bonded to the plate springs 6. The outer peripheral portions of the respective plate springs 6 are secured by bonding to a carriage 5, so that the objective lens holder 1 is mounted in the carriage 5. The objective lens holder 1 is displaceable relative to an optical disk 7 both in a focusing direction and in a tracking direction. In order to move the carriage 5 in the radial direction of the optical disk 7, two opposed linear motor coils 8, 9 are wound around bobbins 10, 11 which are secured by bonding to opposite sides of the carriage 5. A fixed optical base 12 generates a light beam used for recording/reproducing information on the optical disk 7. The light beam is projected on a mirror 13 fixed on the bobbin 11 and then is reflected by this mirror 13 toward the objective lens 2. A magnetic circuit which constitutes a fixed unit or member as against the displacement of the objective lens 2 is composed of two opposed back yokes 14, 14, magnets 15, 15 secured by bonding to the respective back yokes 14, 14, two confronting yokes 16, 16 facing the corresponding magnets 15, 15 and two opposed side yokes 17, 18 for completing a closed magnetic circuit. The components of the magnetic circuit are assembled together by a rigid connection in terms of vibration. The carriage 5 is assembled with the magnetic circuit such that parts of the tracking coils 3, focusing coil 4 and linear motor coils 8, 9 are disposed in magnetic gas defined between the magnets 15 and the confronting yokes 16. The magnetic circuit is common to the tracking coils 3, focusing coil 4, and linear motor coils 8, 9. A pair of shafts 19 extends between the side yokes 17, 18 and resiliently retained on the side yokes 17, 18 by means of plate springs 20. The shafts 19 are slidably received in a pair of plain bearings 5a, 5a, respectively, of the carriage 5 so that the carriage 5 is slidable along the shaft 19 in the radial direction of the optical disk 7. The fixed optical base 12 includes a semiconductor laser for generating a light beam for recording and reproducing information on the optical disk 7, optical components, a photoelectric transducer, etc. and is secured to the side yoke 17. The optical disk 7 is rotated at a predetermined speed by a spindle motor 22 secured to the side yoke 18.

The conventional optical unit actuator of the foregoing construction involves problems in maintaining the control characteristics of the optical disk, optical head and control circuit for the optical head when an attempt is made to speed up the rotation of the optical disk for the purpose of increasing the data transfer rate and to minimize the overall size of the unit to conform to the tendency toward a small-diameter optical disk.

The problems associated with the conventional optical unit actuator will be described below with reference to FIG. 8. FIG. 8 shows amplitude-to-vibration performance curves of various components of the actuator obtained when the focusing coil 4 is excited to move the objective lens holder 1 in the focusing direction of the optical disk 7. In this Figure, the solid line indicated by a shows the vibrational characteristic of the objective lens holder 1, and the chain line indicated by b.c shows the vibrational characteristic of the magnets 15 and the back yokes 14.

To insure a reliable recording/reproducing of information on an optical disk 7, it is desired that the objective lens holder 1 does not induce parasitic oscillation even at a high frequency, as indicated by the solid line a, but generates an acceleration which is capable of following a dynamic radial runout and an axial deflection of the optical disk 7.

The acceleration of the objective lens holder 1 means that the magnet 15 and the back yoke 14 are caused to vibrate, as indicated by the chain line b.c, by a reaction force resulting from acceleration of the objective lens holder 1. In this instance, the magnet 15 and the corresponding back yoke 14 are integral with each other and hence vibrate at the same amplitude of vibration. The difference in amplitude between the objective lens holder 1 and the magnet 15 or between the objective lens holder 1 and the back yoke 14 is determined by the ratio of a mass of the objective lens holder 1 to a mass of the magnetic circuit which constitutes a fixed unit or member as against the displacement of the movable objective lens holder 1.

The vibrational energy which vibrates the magnet 15 and the back yoke 14 is transmitted to the fixed optical base 12 via the side yoke 17. Since the side yoke 17 is joined with the magnet 15 and the back yoke 14 in rigid connection in terms of vibration, the fixed optical base 12 is vibrated.

When optical disk 7 is rotating at a high speed in the range of 2400–3600 rpm so as to provide a high data transfer rate, a great acceleration is produced due to the dynamic radial runout and the axial deflection of the rotating optical disk 7. To enable the objective lens 2 to accurately follow the thus rotating optical disk 7 during the recording/reproducing operation, the objective lens holder 1 is highly accelerated. A very large acceleration thus produced creates a considerably large vibrational energy which is in turn transmitted to the fixed optical base 12.

The fixed optical base 12 is thus vibrating under the influence of the vibrational energy. During that time, various optical components, a photoelectric transducer, etc. which are disposed in an optical path extending between the fixed optical base 12 and the optical disk 7 are vibrated. As a result, a control system used for controlling the objective lens 2 to follow the optical disk 7 is in the oscillated condition. Under such condition, the objective lens 2 is no longer possible to accurately follow the movement of a recording surface of the optical disk 7. Thus, an accurate recording/reproducing operation is difficult to achieve.

An optical information recording/reproducing apparatus for use with a small-diameter optical disk must be compact in size and low in profile. Consequently, the optical disk per se is as thin as possible. To this end, an optical disk of a single plate structure is used. The optical disk of the single plate structure is low in rigidity and hence is likely to induce resonance vibration when subjected to a reaction force resulting from the acceleration of the objective lens holder 1 which is transmitted via the spindle motor 22. When the optical disk 7 undergoes resonance vibration, the control system used for controlling the objective lens 2 to follow the recording surface of the optical disk 7 is caused to oscillate. Thus, an accurate recording/reproducing of information on the optical disk is no longer possible.

SUMMARY OF THE INVENTION

With the foregoing difficulties of the prior art in view, it is an object of the present invention to provide an optical unit actuator for information recording/reproducing apparatus which is capable of speeding up the data transfer rate of the apparatus and minimizing the overall size of the apparatus without deteriorating the control characteristics of an optical disk, an optical head and a control circuit for the optical head.

An optical unit actuator of this invention includes an optical unit including an objective lens and displaceable in a predetermined direction relative to a recording medium, a fixed unit which is immovable as against the movable optical unit, and an electromagnetic drive mechanism including at least one coil and a magnet cooperative with the coil to drive the optical unit in the predetermined direction relative to the recording medium. One of the coil and the magnet is fixed to the optical unit and the other of the coil and the magnet is held on the fixed unit with an elastic support means disposed therebetween.

With this construction, when the optical unit including the objective lens is displaced in a direction to access the recording medium, a reaction force acting between the coil and the magnet is produced as a result of acceleration of the optical unit. The reaction force is, however, substantially dampened or taken up by the elastic support means before it is transmitted to the fixed unit. The optical components, a photoelectric transducer, etc. disposed on the fixed unit may vibrate only at a low level and do not induce resonance vibration. The control system for achieving follow-up control of the objective lens relative to the optical disk is protected from oscillation. Thus, recording/reading operation can be performed reliably and accurately.

The above and other objects, features and advantages of the present invention will become more apparent from the following description when making reference to the detailed description and the accompanying sheets of drawings in which preferred structural embodiments incorporating the principles of the present invention are shown by way of illustrative example.

BRIEF DESCRIPTION OF THE DRAWINGS

FIG. 1 is an exploded perspective view of an optical unit actuator for information recording/reproducing apparatus according to a first embodiment of this invention;

FIG. 2 is a cross-sectional view taken along line II—II of FIG. 1;

FIG. 6 is an exploded perspective view of an optical unit actuator of a conventional information recording/reproducing apparatus;

FIG. 7 is a cross-sectional view taken along line VII—VII of FIG. 6; and

DETAILED DESCRIPTION OF THE PREFERRED EMBODIMENTS

Figure 3:
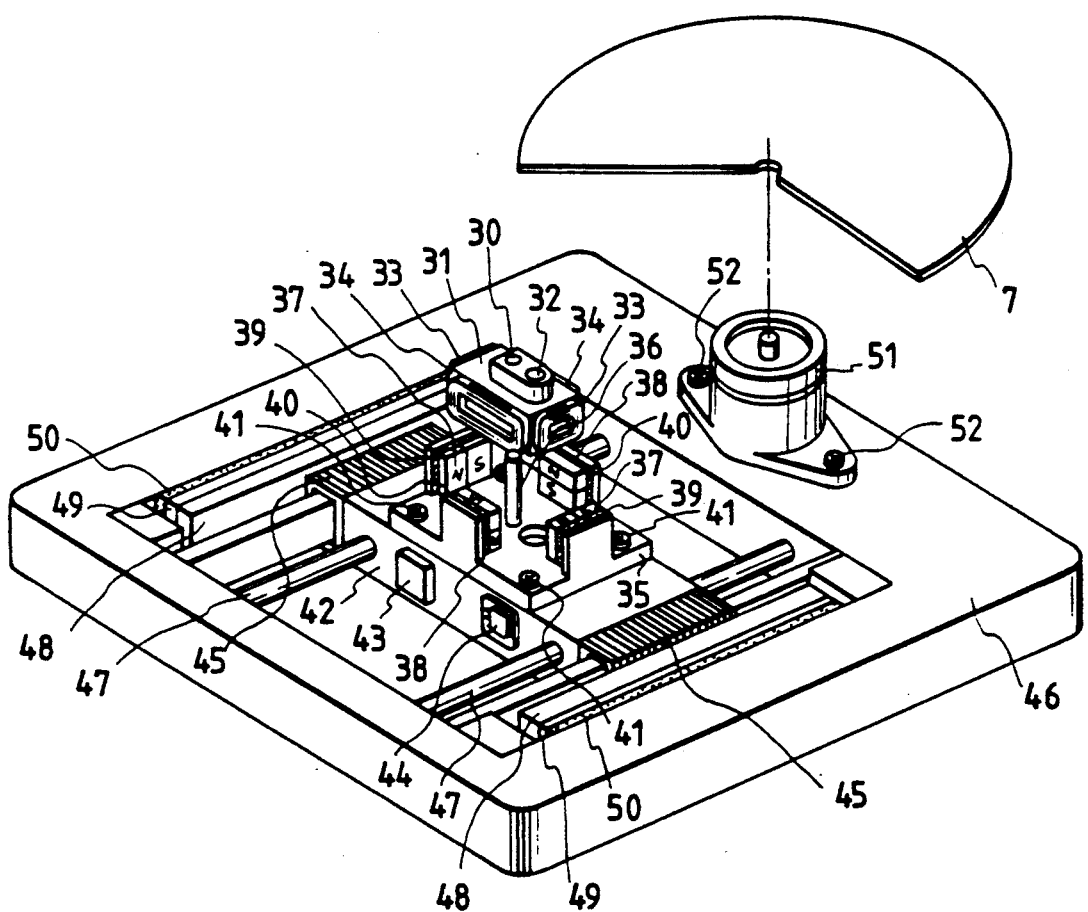
FIG. 3 is an exploded perspective view of a main portion of an optical unit actuator according to a second embodiment of this invention.

FIGS. 1 and 2 shows an actuator for an optical unit of an information recording/reproducing apparatus according to a first embodiment of this invention.

The optical unit actuator includes an objective lens holder 1 to which an objective lens 2, tracking coils 3 and a focusing coil 4 are secured by bonding. The objective lens holder 1 has a pair of aligned central projections (not designated) which are bonded to central holes of two opposed plate springs 6. The outer peripheral portions of the respective plate springs 6 are secured by bonding to opposite sides of a rectangular hollow carriage 5, so that the objective lens holder 1 is mounted in the carriage 5. The thus mounted objective lens holder 1 is displaceable relative to an optical disk 7 both in a focusing direction and in a tracking direction. In order to move the carriage 5 in the radial direction of the optical disk 7, two opposed linear motor coils 8, 9 are wound around bobbins 10, 11 which are secured by bonding to opposite sides of the carriage 5. A fixed optical base 12 generates a light beam for recording/reproducing information on the optical disk 7. The light beam emitted from the fixed optical base 12 is projected on a mirror 13 fixed on the bobbin 11 and subsequently it is reflected by this mirror 13 toward the objective lens 2.

A magnetic circuit which constitutes a fixed unit or member as against the displacement of the objective lens 2 is composed of two opposed back yokes 14, 14, magnets 15, 15 held on the respective back yokes 14, 14 with elastic support members 21 disposed therebetween, two confronting yokes 16, 16 facing the corresponding magnets 15, 15, and two opposed side yokes 17, 18 interconnecting opposite ends of the back yokes 14, the magnets 15 and the confronting yokes 16 to complete a closed magnetic circuit. The components of the magnetic circuit are assembled together by a rigid connection in terms of vibration. The carriage 5 is assembled with the magnetic circuit in such a manner that parts of the tracking coils 3, focusing coil 4 and linear motor coils 8, 9 are disposed in magnetic gaps defined between the magnets 15 and the confronting yokes 16. The magnetic circuit is common to the tracking coils 3, focusing coil 4, and linear motor coils 8, 9. A pair of shafts 19 extends between the side yokes 17, 18 and resiliently retained on the side yokes 17, 18 by means of plate springs 20. The shafts 19 are slidably received in a pair of plain bearings 5a, 5a, respectively, of the carriage 5 so that the carriage 5 is slidable along the shaft 19 in the radial direction of the optical disk 7.

The fixed optical base 12 includes a semiconductor laser (not shown) for generating a light beam used for recording and reproducing information on the optical disk 7, optical components (not shown), a photoelectric transducer (not shown) for receiving the reflected light returning from the optical disk 7, etc. The fixed optical base 12 is secured to the side yoke 17. A spindle motor 22 for rotating the optical disk 7 at a predetermined speed is secured to the side yoke 18.

The optical head of the foregoing embodiment is a separate type optical head in which the fixed optical base 12 is always disposed in a given position regardless of the position of the objective lens 2 in the radial direction of the optical disk 7.

FIG. 3 shows a main portion of an optical unit actuator according to a second embodiment of this invention. The optical unit actuator includes a rectangular objective lens holder 31 to which an objective lens 32, two opposed tracking coils 33 and two opposed focusing coils 34 are secured by bonding. The objective lens holder 31 has a vertical plain bearing 30 slidably fitted over a support shaft 36 upstanding from a central portion of a rectangular actuator base 35. The objective lens holder 31 is displaceable relative to the actuator base 35 in the focusing direction and the tracking direction of the optical disk 7. Two opposed tracking magnets 37 for supplying magnetic flux to the tracking coils 33 are held on the actuator base 35 with elastic support members 39 such as rubber sheets disposed between the corresponding tracking magnets 37 and the actuator base 35. The actuator base 35 constitutes a fixed unit or member as against the displacement of the movable objective lens holder 31. Likewise, two opposed focusing magnets 38 for supplying magnetic flux to the focusing coils 34 are held on the actuator base 35 with elastic support members 40 such as rubber sheets disposed between the corresponding focusing magnets 38 and the actuator base 35. The tracking and focusing magnets 37, 38 are magnetized in the manner illustrated in FIG. 3, so that magnetic flux flowing between two adjacent poles of each respective magnet is substantially perpendicular to the direction of a current flowing through the corresponding coil.

A rectangular optical base 42 carries thereon a semiconductor laser 43 for generating a light beam during the infomation recording/reproducing operation, optical components (not shown), a photoelectric transducer 44, etc. The actuator base 35 is secured by a plurality of screws 41 to the optical base 42. The optical base 42 has two linear motor coils 45 on and along its opposite side edges for movement in the radial direction of the optical disk 7. Two parallel spaced guide shafts 47 extend across a rectangular opening in a rectangular drive base 46 and guide the optical base 42 as the optical base 42 moves in the radial direction of the optical disk 7. A pair of elongate magnets 48 for supplying magnetic flux to the respective linear motor coils 45 are secured by bonding to a pair of back yokes 49, respectively. Each magnet 48 and the corresponding back yoke 49 are held on the drive base 46 with an elastic support member 50 such as a rubber sheet disposed therebetween. The drive base 46 constitutes a fixed unit or member as against the displacement of the movable optical base 42 in the radial direction of the optical disk 7. A spindle motor 51 is secured by a pair of screws 52 to the drive base 46 for rotating the optical disk 7 at a predetermined speed.

The optical head of the second embodiment is an integral type optical head in which the objective lens 32 and the optical base 42 are movable, as a single unit, in the radial direction of the optical disk 7.

Figure 4:
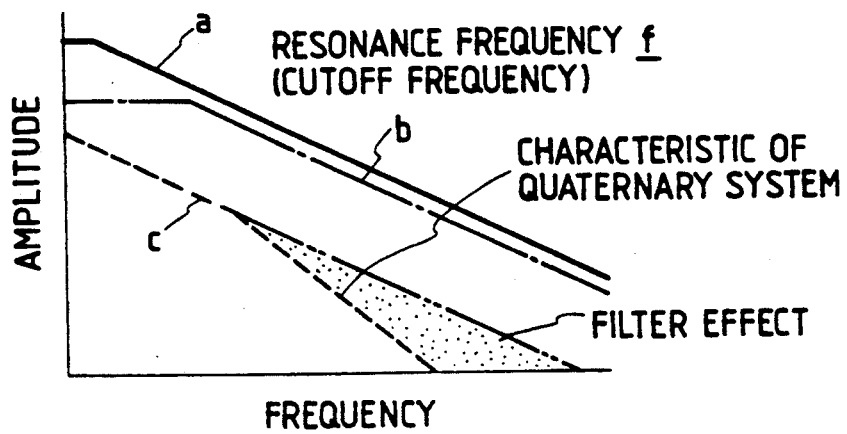
FIG. 4 is a graph showing the vibrational characteristics of the optical unit actuator shown in FIG. 1.

The principle of operation of the optical unit actuator shown in FIG. 1 will be described below with reference to FIG. 4. FIG. 4 shows amplitude-to-vibration performance curves of various components of this actuator which are obtained when the focusing coil 4 is excited to move the objective lens holder 1 in the focusing direction of the optical disk 7. In this Figure, the solid line designated by a indicates the vibrational characteristic of the objective lens holder 1, the chain line designated by b indicates the vibrational characteristic of each magnet 15, and the broken line designated by c indicates the vibrational characteristic of each back yoke 14.

Figure 8:
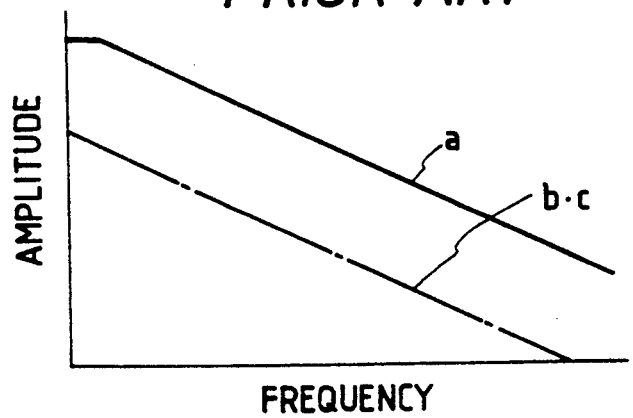
FIG. 8 is a graph showing the vibrational characteristics of the optical unit actuator shown in FIG. 6.

As is apparent from FIG. 4, the vibrational characteristic of the objective lens 1 is the same as the vibrational characteristic of the objective lens 1 of the conventional actuator shown in FIG. 8. The vibrational characteristics of the magnet 15 and the back yoke 14 are, however, different from the vibrational characteristics of the magnet 15 and the back yoke 14 of the conventional actuator shown in FIG. 8.

Since the magnet 15 is held on the back yoke 14 with the elastic support member 21 disposed therebetween, the magnet 15, as it is vibrating under a reaction force resulting from the accelerated objective lens holder 1, undergoes resonance vibration as indicated by the solid line b in FIG. 4. The frequency f of resonance vibration is determined by the mass of the magnet 15 and the spring constant of the resilient support member 21. In a frequency range exceeding the resonance frequency f, the vibration of the magnet 15 changes to follow the characteristic of a secondary system in the same manner as the vibration of the objective lens holder 1.

On the other hand, when the objective lens holder 1 is accelerated, the back yoke 14 is caused to vibrate under a reaction force applied through the elastic support member 21. In this instance, vibration of the back yoke 14 changes to follow the characteristic of the secondary system until the resonance frequency f is reached and thereafter changes to follow the characteristic of a quaternary system.

As obvious from the vibrational characteristics of the respective components of the actuator described above, the elastic support members 21 serve as a mechanical filter (or damper) which substantially dampens or takes up a reaction force resulting from an acceleration of the objective lens holder 1 before it is transmitted to the components disposed downstream of the back yoke 14, such as the side yoke 17 and the fixed optical base 12. As a consequence, the optical components and the photoelectric transducer, which are disposed in an optical path extending between the fixed optical base 12 and the optical disk 7, are unlikely to vibrate at a high frequency beyond the resonance frequency f. The control system used to perform the follow-up control of the objective lens 2 relative to the optical disk 7 is, therefore, protected from oscillation and, hence, an accurate recording/reproducing of information on the optical disk 7 is possible.

Furthermore, owing to the filter effect (or damper effect) of the elastic support member 21, vibration is unlikely to transmit to the spindle motor 22. The optical disk 7 is free from vibration and enables the objective lens 2 to access to a desired point on the recording surface of the optical disk 7. Thus, information can accurately be recorded on, or reproduced from, the optical disk 7.

Obviously, the elastic support members 21 also provide the same filter effect when the tracking coils 3 are excited.

It is preferable that the resonance frequency f, i.e. the cutoff frequency of the filter provided by the elastic support members 21 is set at a frequency level below the node of a servo gain of the objective lens 2.

In general, the node of the servo gain is set at a frequency in the range of 1–4 KHz. In this frequency range, however, the optical components of the fixed optical base 12 and the components of the magnetic circuit are susceptible to resonance vibration. A sufficient filter effect against such resonance vibration is obtained when the cutoff frequency f is set in the range of 100–700 Hz.

Figure 5:
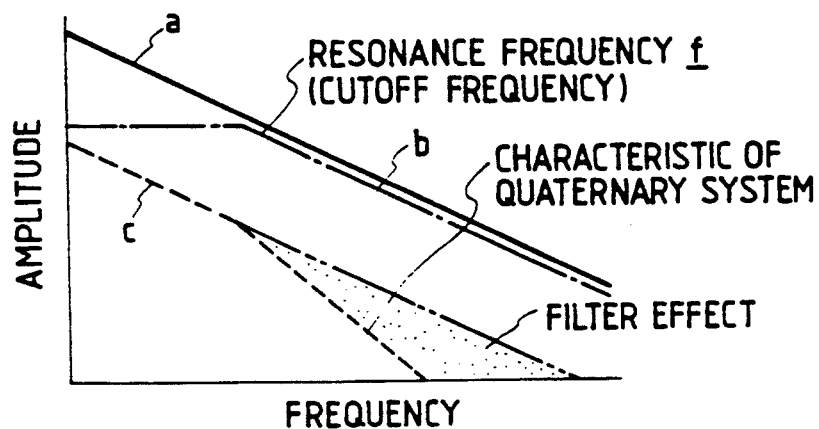
FIG. 5 is a graph showing the vibrational characteristics of the optical unit actuator shown in FIG. 3.

The optical unit actuator of the second embodiment shown in FIG. 3 operates in the same principle as the actuator of the first embodiment. FIG. 5 shows amplitude-to-vibration performance curves of various components of the actuator of the second embodiment which are obtained when the tracking coils 33 are excited to move the objective lens holder 31 in the tracking direction of the optical disk 7. In this Figure, the solid line designated by a indicates the vibrational characteristic of the objective lens holder 31, the chain line designated by b indicates the vibrational characteristic of each tracking magnet 15, and the broken line designated by c indicates the vibrational characteristic of the actuator base 35.

When the objective lens holder 31 is driven in the tracking direction, a reaction force is produced as a result of acceleration of the objective lens holder 31. The reaction force subsequently generates vibration, however, the thus generated vibration is substantially absorbed or taken up by the elastic support members 39 before it is transmitted to the actuator base 35 and the optical base 42. The elastic support members 39 serve as a mechanical filter. The elastic support members 40 also provide a filter effect when the focusing coils 34 are excited. The elastic support members 39, 40 have a cutoff frequency which is determined in the same manner as the cutoff frequency of the elastic support members 21 described above.

In the actuator of the second embodiment, the elastic support members 50 are provided on the corresponding magnets 48 which are provided for supplying magnetic flux to the linear motor coils 45 so as to move the optical base 42 in the radial direction of the optical disk 7. The elastic support members 50 thus provided serve to lower the level of vibration caused by a reaction force which acts on the magnets 48 as a result of acceleration of the optical base 42 while the optical base 42 is moving in the radial direction of the optical disk 7. The drive base 46 and the spindle motor 51 are, therefore, subjected to vibration of a very low level which is no longer effective to induce resonance vibration of the optical disk 7. The node of a gain of the linear motor is set at a relatively low frequency level as compared to the gain node of the objective lens 32, so that the cutoff frequency c of the elastic support members 50 must be set within an appropriate frequency range to conform to the gain node of the linear motor.

As described above, the optical unit actuators of the foregoing embodiments, as against the conventional actuator, includes an elastic support member associated with a magnet which supplies magnetic flux to a coil for driving an optical unit and an objective lens mounted thereon.

With this construction, even when the magnet is vibrating at a relatively large amplitude such as several hundred μm due to resonance vibration of the associated elastic support member, vibration of the magnet does not exert negative influence at all on the vibrational characteristic of the optical unit including the objective lens which is driven by the coil disposed in a parallel magnetic field produced by the magnet.

The actuators of the first and second embodiments described above are of the moving coil type. The present invention is also applicable to a moving magnet type actuator which comprises an optical unit including a magnet and movable in a predetermined direction relative to the optical disk, and a fixed unit including a coil supported thereon by an elastic support member. The elastic support member may be a metal plate spring, a plastic plate spring or the like so long as it possesses the same filter effect.

The optical unit actuator for information recording/reproducing apparatus according to this invention includes a coil secured to a movable optical unit having an objective lens, and a magnet held by an elastic support member on a fixed unit which is stationary as against the displacement of the movable optical unit. The elastic support member is simple in construction and possesses a filter effect which is capable of substantially dampening or taking up vibration caused by a reaction force as a result of an acceleration produced when the optical unit is driven. Thus, the optical components of the fixed unit and the optical disk do not cause resonance vibration and the control characteristics of the optical disk, the optical head and the control circuit for the optical head can, therefore, be maintained. As a result, information is accurately recorded on, or reproduced from, the optical disk.

Obviously various minor changes and modifications of the present invention are possible in the light of the above teaching. It is therefore to be understood that within the scope of the appended claims the invention may be practiced otherwise than as specifically described.

What is claimed is:

1. An optical unit actuator for an information recording/reproducing apparatus, comprising:
   an optical unit including an objective lens and displaceable in a predetermined direction relative to a recording medium;
   a fixed unit immovable as against the displacement of said optical unit, said fixed unit including a magnetic circuit;
   an electromagnetic drive mechanism including at least one coil and a magnet cooperative with said coil to drive said optical unit in said predetermined direction relative to said recording medium, one of said coil and said magnet being fixed to said optical unit, the other of said coil and said magnet being held on said fixed unit in confronting relation to said one of said coil and said magnet so as to form a part of said magnetic circuit; and an elastic support means disposed between said other of said coil and said magnet and said fixed unit for substantially taking up vibration caused by a reaction force produced between said coil and said magnet as a result of acceleration produced when said optical unit including an objective lens moves in said predetermined direction relative to said recording medium.

2. An optical unit actuator according to claim 1, wherein said optical unit includes an objective lens holder to which said coil is secured, said magnetic circuit including an elongate back yoke along which said optical unit is movable, said magnet being held on said back yoke with said elastic support means disposed therebetween.

3. An optical unit actuator according to claim 1, wherein said optical unit includes an objective lens holder to which said objective lens is secured, said fixed unit including an actuator base on which said objective lens holder is movably mounted, said coil being secured to said objective lens holder, said magnet being supported on said actuator base with said elastic support means disposed therebetween.

4. An optical unit actuator according to claim 3, wherein said optical unit further includes an optical base on which said actuator base is fixedly mounted, said fixed unit including a drive base on which said optical base is movably supported, said electromagnetic drive mechanism further including a second coil secured to said optical base, and a second magnet held on said drive base with a second elastic support means disposed therebetween.

5. An optical unit actuator according to claim 1, wherein said elastic support means is made of rubber.

6. An optical unit actuator for an information recording/reproducing apparatus, comprising:
an optical unit including an objective lens and displaceable in a predetermined direction relative to a recording medium;
a fixed unit immovable as against the displacement of said optical unit;
an electromagnetic drive mechanism including at least one coil and a magnet cooperative with said coil to drive said optical unit in said predetermined direction relative to said recording medium; and
one of said coil and said magnet being fixed to said optical unit, the other of said coil and said magnet being held on said fixed unit with an elastic support means disposed therebetween, wherein:
said optical unit includes an objective lens holder to which said coil is secured, said fixed unit including a magnetic circuit having an elongate back yoke along which said optical unit is movable, said magnet being held on said back yoke with said elastic support means disposed therebetween, and
further includes a carriage movably supporting thereon said objective lens holder and slidably movable in the longitudinal direction of said back yoke, said electromagnetic drive mechanism further including a second coil secured to said carriage.

* * * * *